(12) United States Patent
Witt-Sanson et al.

(10) Patent No.: US 10,982,111 B2
(45) Date of Patent: *Apr. 20, 2021

(54) COATING COMPOSITION

(71) Applicant: PPG Industries Ohio, Inc., Cleveland, OH (US)

(72) Inventors: Christelle Witt-Sanson, Grosselfingen (DE); Grzegorz Kondziolka, Zebrzydowice (PL); Nigel Francis Masters, Romford (GB)

(73) Assignee: PPG Industries Ohio, Inc., Cleveland, OH (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/263,561

(22) Filed: Jan. 31, 2019

(65) Prior Publication Data

US 2019/0161642 A1    May 30, 2019

Related U.S. Application Data

(63) Continuation of application No. 14/653,519, filed as application No. PCT/EP2013/077218 on Dec. 18, 2013, now Pat. No. 10,246,610.

(30) Foreign Application Priority Data

Dec. 18, 2012  (EP) .................................. 12197893

(51) Int. Cl.
| | | |
|---|---|---|
| *C09D 179/08* | (2006.01) | |
| *C08K 5/5419* | (2006.01) | |
| *C09D 183/06* | (2006.01) | |
| *B65D 83/14* | (2006.01) | |
| *C08G 73/16* | (2006.01) | |

(52) U.S. Cl.
CPC ........... *C09D 179/08* (2013.01); *B65D 83/14* (2013.01); *C08G 73/16* (2013.01); *C08K 5/5419* (2013.01); *C09D 183/06* (2013.01); *Y10T 428/1355* (2015.01); *Y10T 428/31663* (2015.04); *Y10T 428/31681* (2015.04)

(58) Field of Classification Search
CPC ...... B65D 83/14; C08G 73/16; C08K 5/5419; C09D 179/08; C09D 183/06
See application file for complete search history.

(56) References Cited

U.S. PATENT DOCUMENTS 10,246,610 B2 *  4/2019 Witt-Sanson ........ C09D 179/08

* cited by examiner

*Primary Examiner* — Edward J Cain
(74) *Attorney, Agent, or Firm* — Diane R Meyers

(57) ABSTRACT

A coating composition comprising
 a resin material comprising polyester imide polymer
 one or more titanate material; and
 one or more OH reactive cross linking material.

22 Claims, No Drawings

COATING COMPOSITION

The present invention relates to a coating composition. In particular, the present invention relates to a coating composition for coating onto a metal substrate, particularly onto a metal substrate used in the packaging industry, such as for coating aerosol cans. The invention also extends to a metal substrate coated with the coating composition; a can such as an aerosol can having at least a portion thereof coated with the coating composition.

Cans used for the storage of aerosols, such as personal healthcare aerosols are usually formed from a tube, which is often made of aluminium. One type of such tube is a monobloc aerosol, which is so called because it is formed from a single piece (a small disc know as a "slug") of aluminium.

The surfaces of such cans are required to be coated for various reasons. The external areas of such cans are often coated in a decorative manner and may allow printing thereon to inform a user as to the contents of the can. The internal areas of such cans are coated to protect the can from the contents therein (the contents to be delivered from the can and the propellant), which in some instances may be chemically aggressive. The coating on the can should also protect the contents from the can.

There should be a minimal amount of alteration to the contents from materials, which are products of erosion of the can, or from the coating itself. Accordingly, the coating composition used to coat the internal portion of the can should be designed such that it is able to withstand contact with these aggressive chemicals and to minimise the release of material from the metal of the can or the coating layer into the contents of the can.

Coating compositions known in the art and used to coat such cans, particularly an internal portion thereof, include polyamide imide, which is made in N-methyl pyrrolidone. However, N-methyl pyrrolidone has recently been reclassified as toxic to reproduction and development (reprotoxic) and also listed as having specific organ toxicity for the respiratory tract and thus its use is not desirable.

The use of Bisphenol A in such coatings is also known to be disadvantageous for various well documented health and toxicity reasons.

Accordingly, there is a desire to provide a coating composition for use in aerosol can internals which is able to withstand aggressive chemicals that are stored in such cans, while avoiding toxic components or solvents.

It is an object of aspects of the present invention to provide a solution to one or more of the above mentioned problems.

According to a first aspect of the present invention there is provided a coating composition comprising:
 a resin material comprising a polyester imide polymer;
 one or more titanate material; and
 one or more OH reactive crosslinking material.

Suitably, the polyester imide polymer comprises a polyester linkage and one or more imide in the backbone of the polymer.

Suitably, the polyester imide polymer is formed from one or more imide containing moiety. The imide containing moiety suitably also comprises one or more acid group and/or one or more alcohol group. In one embodiment, the imide containing moiety may contain at least two acid groups, at least two alcohol groups or at least one acid group and at least one alcohol group.

The imide containing moiety may contain a cyclic imide group.

The imide containing moiety may be formed as a reaction product between one or more primary amine or one or more isocyanate with one or more cyclic anhydride. For example, typical components in such a reaction may include a difunctional isocyanate such as methylene di-phenyl di-isocyanate, with an anhydride such as trimellitic anhydride.

For example, one embodiment of such a reaction is shown in Scheme I, below.

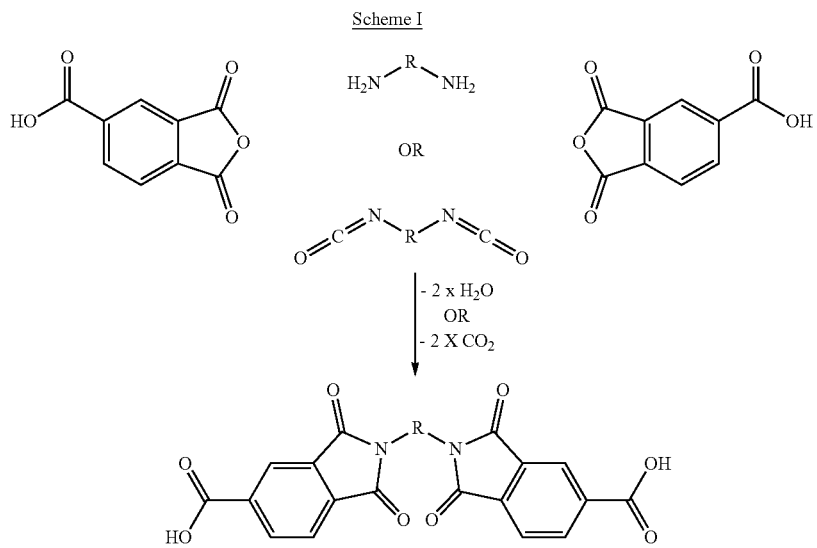

Scheme I

As can be seen from the above reaction scheme, the formed imide containing moiety is a di-acid substituted imide, which may then be reacted with a diol (ethylene glycol, for example) in a polyesterification reaction to thereby form the imide containing polyester (polyester imide).

An alternative example of forming an imide containing moiety is shown in scheme 2, below. Scheme 2 shows the reaction of trimellitic anhydride with bis (4-isocyanatocyclohexyl) methane to form a di-imide di-acid.

Scheme 2

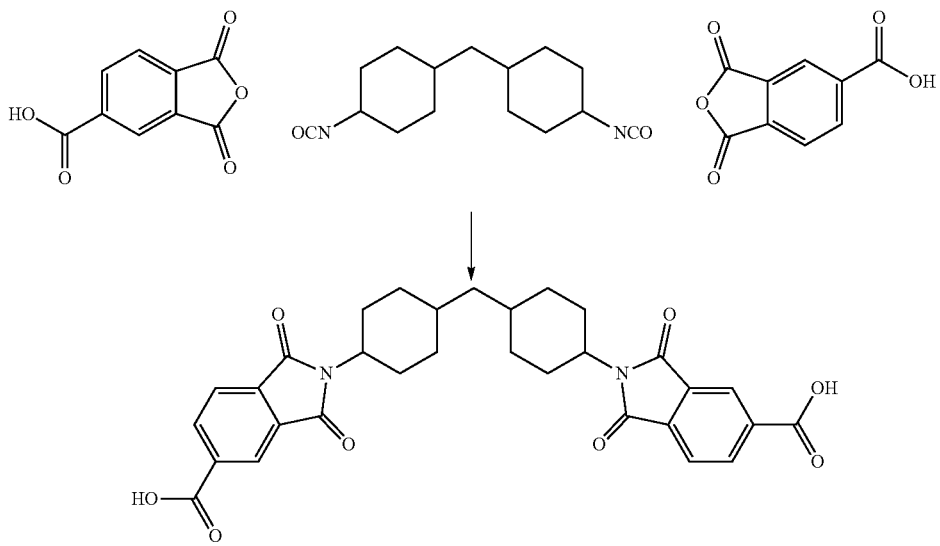

In a further example, a reaction leading to the formation of an imide containing moiety which is monoacid, mono hydroxyl substituted is shown in scheme 3, below. In this example a primary amine with additional hydroxyl functionality, mono ethanol amine, reacts with trimellitic anhydride to produce a cyclic imide with hydroxyl and acid functionality. The mono imide product shown in scheme 3 may then react with other diols, polyols and diacids in a polyesterification reaction to thereby form the imide containing polyester (polyester imide).

Alternatively or additionally, the reaction product in Scheme 3 may self condense in a polyesterification reaction.

Scheme 3

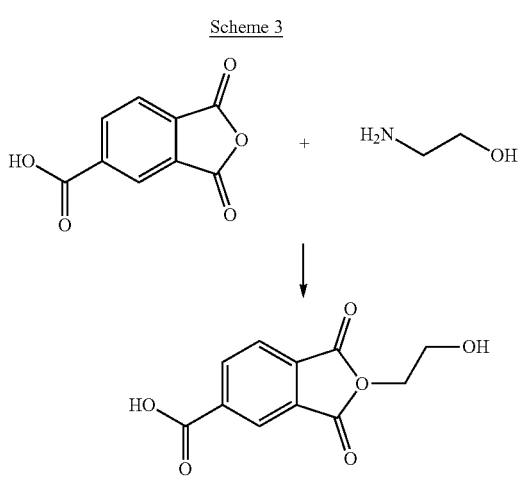

Examples of suitable amines that could be used include diamines such as, ethylene diamine; 1,3 propane diamine; tetramethylene diamine; 1,6 hexane diamine; trimethyl hexane 1,6 diamine; isophrone diamine diaminodiphenylmethane (methylene dianaline); diaminodiphenylether; diaminodiphenylsulphone; methylene-4 4'-cyclohexyl diamine; benzoguanamine; ortho-Xylylene diamine; meta-Xylylene diamine; para-xylylenediamine; 1,2 Cyclohexanediamine; 1,4 Cyclohexanediamine; amines can also include hydroxyamines such as monoethanol amine; monopropanolamine; or aminocarboxylic acids such as glycine; aminopropionic acids or amino benzoic acids.

Examples of suitable isocyanates include, hexamethylene di-isocyanate; tetramethylene di-isocyanate; isophorone di-isocyanate; methylene 4,4'-bis (cyclohexyl isocyanate) or Bis-(4-isocyanatocyclohexyl)methane; Methylene di phenyl di-isocyanate or bis-(4-isocyanatophenyl)methane; Tetramethyl-meta-xylylene di isocyanate; meta xylylene di-isocyanate; para xylylene di-isocyanate; Cyclohexane di-isocyanate; naphthalene di-isocyanate; trimethyl hexamethylene di-isocyanate.

Examples of suitable cyclic anhydrides include trimellitic anhydride; pyromellitic di-anhydride; maleic anhydride; 3,3',4,4'-benzophenonetetracarboxylic dianhydride; tetrahydrophthalic anhydride; 1,4,5,-naphthalenetricarboxylic anhydride; 1,4,5,8-Naphthalenetetracarboxylic dianhydride; hemimellitic anhydride.

In one embodiment, the imide containing moiety is formed generally in the absence of diol or polyol (ie. less than 1% by weight diol or polyol, suitably, less than 0.5% by weight, more suitably less than 0.1% by weight, such as less than 0.05% by weight or less than 0.01% by weight). The imide containing moiety may be formed in the absence of diol or polyol.

However, in an alternative embodiment, the imide containing moiety may be formed in the presence of one or more diol or polyol.

The polyester imide polymer is suitably formed by reaction of an imide containing moiety with one or more diol, polyol (or other primarily hydroxy functional branching monomer), dicarboxylic acid, di-ester or a component containing one acid (or ester) and one alcohol group, as the case may be (depending on the functionality of the imide) to thereby form a polyester.

Examples of suitable one or more diol includes ethylene glycol; 1,2 propane diol; 1,3-propane diol; 1,2-butanediol; 1,3 butandiol; 1,4 butanediol; 2,3-butane diol; 2-methyl 1,3-propane diol; 2,2'-dimethyl-1,3-propanediol; 1,5 pentane diol; 3-methyl-1,5-pentanediol; 1,6-hexane diol; diethylene glycol; triethylene glycol; dipropylene glycol; tripropylene glycol; 2,2,4 trimethyl pentane 1,3 diol; 1,4 cyclohexane dimethanol; Tricyclodecane dimethanol; 2,2,4,4-tetramethyl cyclobutane 1,3 diol; isosorbide; 1,4 cyclohexane diol; 1,1'isopropylidene-bis (4-cyclohexanol) and mixtures thereof.

Examples of suitable one or more polyol (or other, primarily hydroxy, functional branching monomer) include: tris (hydroxyethyl)isocyanurate; trimethylol propane; trimethylol ethane; 1,2,6 hexane triol; pentaerythritol; erythritol; di-trimethylol propane; di-pentaerythritol; N,N,N',N' tetra (hydroxyethyl)adipindiamide; N,N,N',N' tetra (hydroxypropyl)adipindiamide; tri(hydroxy ethyl) amine; hexahydro-1,3,5-tris(hydroxyethyl)-s-triazine; N,N,N',N'-tetrakis(hydroxyethyl)ethylenediamine; di ethanol amine; or mixtures thereof.

Examples of suitable one or more di carboxylic acid include: isophthalic acid; terephthalic acid; 1,4 cyclohexane dicarboxylic acid; succinic acid; adipic acid; azelaic acid; sebacic acid; fumaric acid; 2,6-naphthalene dicarboxylic acid; orthophthalic acid. Dicarboxylic acids can also be used in the form of the di-ester materials, such as: dimethyl ester derivatives such as dimethyl isophthalate; dimethyl terephthalate; dimethyl 1,4 cyclohexane dicarboxylate; dimethyl-2,6-naphthalene di carboxylate; dimethyl fumarate; dimethyl orthophthalate; dimethylsuccinate; dimethyl glutarate; dimethyl adipate, or mixtures thereof.

The formation of the polyester imide polyester (the polyesterification) may take place in the presence of a catalyst. Suitable catalysts include: tetra n butyl titanate; tetra iso propyl titanate; tetra ethyl hexyl titanate; zinc acetate; di butyl tin oxide; butyl stannoic acid.

The polyester imide polymer is suitably hydroxyl functional, by which it is meant that the polyester imide polymer comprises OH groups that are available for subsequent reaction, such as pendant OH groups for example.

In one embodiment of the invention the polyester imide polymer may be a predominantly hydroxyl functional polymer formed by first reacting a cyclic anhydride component with an amine or isocyanate component at a suitable temperature to produce a cyclic imide with reactive functionality in a first stage reaction (imide preparation reaction), which may be undertaken in the presence of a promoter/catalyst. However, in some cases catalysis may not be required. In a second stage reaction (polyesterification reaction) the other components diols, polyols and diacid or ester derivatives as the case may be (depending on the functionality of the imide) may be added to the product of the first stage reaction, together with appropriate catalysts (where required).

The amount of diol and polyol present in the polyesterificaiton reaction may be sufficient to provide an excess of hydroxyl functionality in the formation which may provide the predominant hydroxyl functionality in the final polymer. The polyesterification reaction is suitably carried out at sufficient temperature to allow for removal of water or alcohol (particularly methanol) by-product as the polymer is formed. The polyesterification reaction progress may be monitored by appropriate methods including: amount of distillate released, acid value of the polymer (measured in units of mgKOH/gm) or viscosity (melt viscosity or solution viscosity) of the polymer. The polyester imide polymer may have functional end groups including hydroxyl groups, acid groups or ester groups from mono alcohols. The polyester imide polymer may be suitably processed to a target viscosity range and/or functional end group targets, such as acid values.

In one embodiment of the invention, the polyester imide polymer may be a predominantly hydroxyl functional polymer and may be formed by first reacting a cyclic anhydride component with an amine or isocyanate component in the presence of some or all of the diol component at a suitable temperature to produce the cyclic imide with reactive functionality. In such a first stage reaction, a promoter/catalyst may be added. However, in some cases catalysis may not be required.

In a second stage the other components of the polyester imide, including any remaining diols, polyols and diacid or ester derivatives may be added together with appropriate catalysts. The amount of diol and polyol added may be sufficient to provide an excess of hydroxyl functionality which provides a predominant hydroxyl functionality in the final polyester imide polymer.

Suitably, the second stage reaction is carried out at sufficient temperature to allow for removal of water or alcohol (particularly methanol) bi-product, as the polymer is formed. The second stage reaction progress may be monitored by appropriate methods including amount of distillate released, acid value of the polymer (measured in units of mgKOH/gm) or viscosity (melt viscosity or solution viscosity) of the polymer. The final polyester imide polymer has functional end groups including hydroxyl groups, acid groups or ester groups from monoalcohols. The polyester imide polymers may be processed to target viscosity ranges and/or functional end group targets, such as acid values.

In one embodiment of the invention the polyester imide polymer may be formed by first reacting diols, polyols and diacid or ester derivatives (a polyesterification reaction) which may be undertaken in the presence of a promoter/catalyst. However, in some cases catalysis may not be required. In a second stage reaction a cyclic anhydride component and an amine component (or possibly an isocyanate component) are added and the subsequent reaction is conducted at a suitable temperature to produce a cyclic imide with reactive functionality which further reacts with the polyester oligomers formed in a first stage reaction (polyesterification reaction). Appropriate catalysts/reaction promoters can be added as required, however, in some cases catalysts may not be required. Such a polyester imide polyester may be a predominantly hydroxyl functional polymer.

The amount of diol and polyol present in the polyesterificaiton reaction may be sufficient to provide an excess of hydroxyl functionality, which may provide the predominant hydroxyl functionality in the final polymer. The polyesterification reaction is suitably carried out at sufficient temperature to allow for removal of water or alcohol (particularly methanol) by-product as the polymer is formed. The polyesterification reaction progress, in stage 1, and the imide formation and reaction, in stage 2, may be monitored by appropriate methods including: amount of distillate released, acid value of the polymer (measured in units of mgKOH/gm) or viscosity (melt viscosity or solution viscosity) of the polymer. The polyester imide polymer may have functional end groups including hydroxyl groups, acid groups or ester groups from mono alcohols. The polyester imide polymer may be suitably processed to a target viscosity range and/or functional end group targets, such as acid values.

In one embodiment, the polyester imide polymer comprises at least about 1% of imide (by weight of components), suitably, in the backbone thereof. The polyester imide polymer may comprise at least about 2% and suitably at least about 3% of imide (by weight of components), suitably in the backbone thereof.

The polyester imide polymer may comprise less than about 50%, suitably less than about 30% imide (by weight of components), suitably in the backbone thereof. In one embodiment, the polyester imide polymer comprises less than about 25%, suitably less than about 20% imide (by weight of components), suitably in the backbone thereof.

The polyester imide polymer may comprise between about 2 to 20%, such as between about 4% to 18% imide (by weight of components), suitably in the backbone thereof.

In referring to a percentage of imide present in the polyester imide polymer (by weight of the components) it is meant the following. The polyester imide polymers contain imide units made up of the chemical structural unit [—N(C=O)$_2$—], which has an atomic mass of 70 gmol$^{-1}$. In order to get some quantification of weight of the polymer components which we can theoretically form imide we can perform a calculation to calculate the % weight of imide by weight of components. The calculation is shown below:—

{Mols of imide used (or mols of components that form the imide, such as the cyclic anhydride)× 70×100), divided by {sum total weight of polymer components}

The proportion of imide formed in the polyester imide polymers can also be characterised by reference to the molar proportions of the components. In particular, we can refer to the ratio of molar amount of imide forming groups to the molar amount of ester forming groups (the molar amount of carboxylic acid or their equivalents such as the amount of methyl esters). This can then be used to calculate a % imide equivalent, as per the calculation below:

{mols of imide forming group (or Cyclic anhydride)×100}/{(mols of imide forming group)+ (mols of ester forming group)}

In one embodiment, the polyester imide polymer may have a % imide equivalent value of at least about 5% and suitably at least about 10%, such as at least about 15%.

The polyester imide polymer may have a % imide equivalent value of less than about 60%, suitably less than about 50%, such as, for example, less than about 45%.

In one embodiment the polyester imide polymer may have a % imide equivalent value of between about 5-50%; suitably between about 13-45%, such as, for example, between about 18-41%.

In one embodiment, the polyester imide polymer may have an Mn of between about 100 and 10,000, suitably between 500 and 5000.

The coating composition of the present invention comprises one or more titanate material. Suitably, the titanate material may comprise one or more organic titanate material, such as titanate substituted with one or more (such as one, two, three or four) organic groups. Each organic group in this context may include a substituted or unsubstituted, linear, cyclic or branched $C_1$ to $C_{12}$ alkyl, alkenyl, or aryl group.

For example, the titanate material may comprise titanate substituted with one or more (such as one, two, three or four) organic groups, each independently selected from methyl, ethyl, n-propyl, isopropyl, n-butyl, t-butyl, pentyl, hexyl, cyclohexyl.

In one embodiment, the titanate material may comprise tetra n-butyl titanate, Ti(O-nC$_4$H$_8$)$_4$; tetra iso propyl titanate, Ti(O—CH(CH$_2$)$_2$)$_4$; tetra ethyl hexyl titanate, Ti(O—CH$_2$—CH(C$_2$H$_5$)—CH$_2$—CH$_2$—CH$_2$—CH$_3$)$_4$.

The coating composition of the present invention comprises one or more OH reactive crosslinking material. By the term "OH reactive crosslinking material" it is meant a material that is operable to crosslink a polymer by reaction with OH groups on the polymer.

Examples of suitable OH reactive crosslinking materials include phenolic materials, isocyanate materials, amino resins or hydroxyl functional silicone resins.

Suitable phenolic materials include PHENODUR EK-827 or PHENODUR VPR1785 or PHENODUR PR 515 or PHENODUR PR516 or PHENODUR PR 517 or PHENODUR PR 285 (commercially available from Cytec Industries), SFC 112 (commercially available from Schenectady) or BAKELITE 6535 or BAKELITE PF9989 or BAKELITE PF6581 (commercially available from Hexion Speciality Chemicals) or other type of crosslinkers to react with the OH groups externally.

Suitable isocyanate materials include IPDI (isophorone diisocyanate) like DESMODUR VP-LS 2078/2 or DESMODUR PL 340 (commercially available from Bayer) or VESTANAT B 1370 or VESTANAT B1358A (commercially available from Evonik) or blocked aliphatic polyisocyanate based on HDI like DESMODUR BL3370 or DESMODUR BL 3175 SN (commercially available from Bayer) or DURANATE MF-K60X ((commercially available from Asahi KASEI) or TOLONATE D2 ((commercially available from Perstorp).

Suitable amino resins include melamine formaldehyde type materials of the hexakis(methoxymethyl)melamine (HMMM) type such as KOMELOL 90GE (commercially available from Melamin), MAPRENAL MF900 (commercially available from Ineos Melamines) or RESIMENE 745 or RESIMENE 747 (commercially available from Ineos Melamines) or CYMEL 303 or CYMEL MM100 (commercially available from Cytec). Other melamine formaldehyde type material such as butylated methylol melamine type resins such as CYMEL 1156 or CYMEL 1158 (commercially available from Cytec) or mixed ether type methylal melamine resins such as CYMEL 1116, CYMEL 1130, CYMEL 1133 or CYMEL 1168 (commercially available from Cytec) or part methylolated and part methalated melamine type resins such as CYMEL 370, CYMEL 325 or CYMEL 327 (commercially available from Cytec).

Other types of suitable amino resins include benzoguanamine, formaldehyde type materials like CYMEL1123 (commercially available from Cytec), Itamin BG143 (commercially available from Galstaff Multiresine) or Uramex BF892 (commercially available from DSM). Further examples of suitable amino resins include glycouril based materials such as CYMEL 1170 and CYMEL 1172 (commercially available from Cytec).

Suitable hydroxyl-functional silicone resins include DOW CORNING 255 or DOW CORNING 217 (commercially available from Dow Corning).

Suitably, the resin material comprising a polyester imide polymer is present in the coating composition in an amount of at least 25 wt % (based on the dry weight of the coatings ingredients), more suitably at least 40 wt % (based on the dry weight of the coatings ingredients).

Suitably, the resin material comprising a polyester imide polymer is present in the coating composition in an amount of at less than about 99 wt % (based on the dry weight of the coatings ingredients), more suitably less than about 90 wt % (based on the dry weight of the coatings ingredients).

Suitably, the resin material comprising a polyester imide polymer is present in the coating composition in an amount of between about 50-99 wt % (based on the dry weight of the coatings ingredients) and most suitably between about 70-90 wt % (based on the dry weight of the coatings ingredients).

In one embodiment, the resin material comprising a polyester imide polymer is present in the coating composition in an amount of between about 75-85 wt % (based on the dry weight of the coatings ingredients) and most suitably about 80 wt % (based on the dry weight of the coatings ingredients).

Suitably, the one or more titanate material is present in the coating composition in an amount of at least 1 wt % (based on the dry weight of the coatings ingredients), more suitably at least 5 wt % (based on the dry weight of the coatings ingredients).

Suitably, the one or more titanate material is present in the coating composition in an amount of at less than about 25 wt % (based on the dry weight of the coatings ingredients), more suitably less than about 15 wt % (based on the dry weight of the coatings ingredients).

Suitably, the one or more titanate material is present in the coating composition in an amount of between about 1-15 wt % (based on the dry weight of the coatings ingredients) and more suitably between about 5-10 wt % (based on the dry weight of the coatings ingredients). In one embodiment, the one or more titanate material is present in the coating composition in an amount of between about 6-8 wt % (based on the dry weight of the coatings ingredients) and more suitably about 7 wt % (based on the dry weight of the coatings ingredients).

Suitably, the one or more OH reactive crosslinking material is present in the coating composition in an amount of at least 0.5 wt % (based on the dry weight of the coatings ingredients), more suitably at least 2 wt % (based on the dry weight of the coatings ingredients).

Suitably, the one or more OH reactive crosslinking material is present in the coating composition in an amount of at less than about 25 wt % (based on the dry weight of the coatings ingredients), more suitably less than about 15 wt % (based on the dry weight of the coatings ingredients).

Suitably, the one or more OH reactive crosslinking material is present in the coating composition in an amount of between about 0.1-25 wt % (based on the dry weight of the coatings ingredients) and more suitably between about 3-12 wt. In one embodiment, the one or more OH crosslinking material is present in the coating composition in an amount of between about 5-9 wt % (based on the dry weight of the coatings ingredients) and more suitably between about 6.5-7 wt % (based on the dry weight of the coatings ingredients).

The coating composition may further comprise one or more filler; lubricant; etc. as is usual in the art. Examples include polyester modified polydimethylsiloxane; phenylmethylpolysiloxane; polyether siloxane copolymer; siloxane-based gemini surfactant; cellulose aceto butyrate.

The coating composition may further comprise one or more catalyst as is known in the art to promote the curing of the coating composition, in use.

Surprisingly, the inventors of the present invention have also identified that an acidic polyester, may be particularly advantageous as a further ingredient in the coating composition of the present invention as an adhesion promoter.

The acidic polyester may be added in an amount of between about 0.1-10 wt % (based on the dry weight of the coatings ingredients), more suitably between about 2-8 wt % (based on the dry weight of the coatings ingredients). In one embodiment, the acidic polyester may be present in an amount of between about 4-7 wt % (based on the dry weight of the coatings ingredients) more suitably, between about 5-6 wt % (based on the dry weight of the coatings ingredients).

The acidic polyester may comprise a reaction product of one or more polyester with a phosphorus acid, such as phosphoric acid. In this context, the polyester may have an Mn of 2000 to 10,000. The polyester may have a hydroxyl number of 20 to 75. The polyester may have an acid value of 15 to 25.

Suitably, the acidic polyester comprises a solution of a copolymer with acidic groups having an acid value from 15 up to 100 mgKOH/g. Examples of commercially available suitable acidic polyesters include are BYK-4510 (commercially available from Byk Altana) or PLUSOLIT H-PD (commercially available from Mader) or BORCHI GEN HMP-F or BORCHI GEN HE (commercially available from OMG Borchers).

In a suitable embodiment, the acidic polyester may generally comprise the reaction product of:
(a) a polyester having an Mn of 2000 to 10,000, a hydroxyl number of 20 to 75, and an acid value of 15 to 25; the polyester being a polycondensate of:
    (i) a polyol component comprising a mixture of diols and triols,
    (ii) a polyacid component comprising an alpha, beta-ethylenically unsaturated polycarboxylic acid, and
(b) a phosphorus acid.

Further suitable examples of acidic polyesters are given in WO 2012/162301, the contents of which are entirely incorporated herein by reference.

According to a further aspect of the present invention there is provided the use of an acidic polyester as an adhesion promoter in a coating composition, the coating composition comprising
    a resin comprising polyester imide
    one or more titanate material
    one or more OH reactive cross linking material.

Surprisingly, the inventors of the present invention have also identified that a silane material may be advantageous as a further ingredient in the coating composition of the present invention, particularly in relation to improved chemical resistance of the coating. Thus in one embodiment, the coating composition may comprise one or more silane material.

Therefore, according to a further aspect of the present invention, there is provided a coating composition comprising:
    a resin material comprising a polyester imide polymer;
    one or more titanate material;
    one or more OH reactive crosslinking material; and
    one or more silane material.

The silane material may be any silane material comprising a molecule having a single or multiple silicon atoms. This includes polysilanes, polysiloxanes or other silicon containing polymers.

In one embodiment, the silane material comprises a silane material according to Formula I, or a polysiloxane polymer derived from one or more silane material according to Formula I:

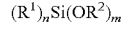

$$(R^1)_n Si(OR^2)_m \qquad \text{I}$$

wherein each $R^1$ is independently selected from an optionally substituted linear or branched alkyl group, which may comprise one or more functional groups;
each $R^2$ independently represents H or an alkyl group optionally substituted linear or branched alkyl groups;
n=1 to 3;
m=1 to 3; and
n+m=4.

The or each functional group may comprise any one or more of the following groups: hydroxyl, epoxy, amino (primary, secondary or tertiary), amido, cyano, isocyano, ethylenic unsaturation (ie one or more carbon—carbon double bonds), carboxylic acid, aldehyde, ketone, C=O, esters (such as C1 to C4 alkyl esters of carboxylic acids), alkyl carboxyl oxy (such as optionally substituted, linear or branched, saturated or unsaturated C1 to C6 alkyl carboxyl oxy, including acryloxy and methacryloxy).

In one embodiment, n=1 to 2, m=2 to 3 and n+m=4.

In one embodiment, n=1, m=3 and n+m=4.

Examples of suitable R1 groups include an alkyl chain (branched or linear) containing 1 to 12 carbon atoms including methyl, ethyl, propyl, butyl, pentyl, hexyl, heptyl, octyl, nonyl, decyl, undecyl or dodecyl; aminoalkyl; epoxyalkyl; acryloxyalkyl; and methacryloxy propyl.

Suitably, each $R^2$ may be independently selected from H, methyl, ethyl, propyl or butyl, particularly suitably H, methyl or ethyl.

The silane material may comprise one or more of the following: γ-glycidyloxypropyl trialkoxy silane, such as γ-glycidyloxypropyl triethoxy silane or γ-glycidyloxypropyl trimethoxy silane; γ-Glycidoxypropyl trialkoxysilane, such as γ-Glycidoxypropyl triethoxysilane or γ-Glycidoxypropyl trimethoxysilane; alkyl trialkoxy silane, such as octyl triethoxysilane or octyl trimethoxysilane; (N-(β-aminoethyl)-γ-aminopropyl trialkoxysilane, such as (N-(β-aminoethyl)-γ-aminopropyl trimethoxysilane, or (N-(β-aminoethyl)-γ-aminopropyl triethoxysilane; γ-methacryloxypropyl trialkoxysilane, such as γ-methacryloxypropyl trimethoxysilane, or γ-methacryloxypropyl triethoxysilane.

In one embodiment, the coating composition is a powder coating composition.

Accordingly, the present invention provides a powder coating composition comprising a resin material comprising polyester imide one or more titanate material one or more OH reactive cross linking material.

In an alternative embodiment, the coating composition is a liquid coating composition. The liquid coating composition comprises a solvent. Therefore, according to one aspect of the present invention there is provided a liquid coating composition comprising a resin material comprising polyester imide one or more titanate material one or more OH reactive cross linking material; and a solvent.

The solvent suitably comprises one or more polar solvent. Examples of suitable solvents include benzyl alcohol, propylene carbonate, ethylene carbonate, ethyl lactate, dimethyl sulphoxide, gammabutyrolactone, gamma valerolactone, tetrahydrofurfurylalcohol, tetrahydrofurfurylalcohol acetate, butyl glycol, methoxy propanol; butyl diglycol, 3-methoxy-3-methyl-butan-1-ol, cyclohexanone, cyclopentanone, ethylene glycol diacetate, butyl glycol acetate and dibasic esters; and mixtures thereof.

The solvent may also comprise, one or more hydrocarbon diluents, suitable hydrocarbon diluents include the aromatic hydrocarbons xylene, mixed xylenes, SOLVESSO 100 (available from Exxon Chemical) or similar commercially available aromatic hydrocarbon mixtures and 150 or SOLVESSO 150 (Naphthalene depleted) (available from Exxon Chemical) or similar commercially available aromatic hydrocarbon mixtures.

In certain embodiments, the coating compositions of the present invention, may be substantially free, may be essentially free and/or may be completely free of bisphenol A and derivatives or residues thereof, including bisphenol A ("BPA") and bisphenol A diglycidyl ether ("BADGE"). Such coating compositions are sometimes referred to as "BPA non intent" because BPA, including derivatives or residues thereof, are not intentionally added but may be present in trace amounts because of impurities or unavoidable contamination from the environment. The coating compositions can also be substantially free and may be essentially free and/or may be completely free of bisphenol F and derivatives or residues thereof, including bisphenol F and bisphenol F diglycidyl ether ("BFDGE"). The term "substantially free" as used in this context means the coating compositions contain less than 1000 parts per million (ppm), "essentially free" means less than 100 ppm and "completely free" means less than 20 parts per billion (ppb) of any of the above mentioned compounds, derivatives or residues thereof.

In certain embodiments, the coating compositions of the present invention, may be substantially free, may be essentially free and/or may be completely free of N-methyl pyrollidone. The term "substantially free" as used in this context means the coating compositions contain less than 1000 parts per million (ppm), "essentially free" means less than 100 ppm and "completely free" means less than 20 parts per billion (ppb) of any of the above mentioned compounds, derivatives or residues thereof.

According to a further aspect of the invention there is provided a metal substrate coated on at least a portion thereof with a coating composition, the coating composition comprising a resin material comprising polyester imide one or more titanate material one or more OH reactive cross linking material.

The metal substrate may comprise aluminium, such as an aluminium tube.

Suitably, the metal substrate comprises a monoblock aerosol can.

Therefore according to a further aspect of the present invention there is provided an aluminium tube, at least a portion thereof being coated with a coating composition, the coating composition comprising a resin material comprising polyester imide one or more titanate material; and OH reactive cross linking material Suitably, the aluminium tube comprises a monoblock aerosol can and in one embodiment, the at least a portion thereof that is coated with a coating composition is a portion of an inside thereof.

According to a yet further aspect of the present invention there is provided the use of a resin material comprising polyester imide in the coating of a portion of an internal portion of an aluminium aerosol can.

According to a yet further aspect of the present invention there is provided the use of a silane material for improving chemical resistance in a coating composition, the coating composition comprising a resin material comprising polyester imide one or more titanate material; and one or more OH reactive cross linking material.

All of the features contained herein may be combined with any of the above aspects and in any combination.

EXAMPLES

Reference will now be made, by way of example only to the following non-limiting examples.

Preparation of Polyesterimide Polymer

The polyesterimide resins were prepared according to the following.

Preparative Example 1 (PEI 1)

Formulation

| | Component | Amount (g) |
|---|---|---|
| 1. | DESMODUR W [1] (Bis(4-isocyanatocyclohexyl) methane) | 42.19 |
| 2. | Trimellitic anhydride | 64.8 |
| 3. | 1, 2 Propane diol | 71.25 |
| 4. | Tris hydroxyethylisocyanurate (THEIC) | 77.49 |
| 5. | Isophthalic acid | 24.12 |
| 6. | Terephthalic acid | 72.37– |
| 7. | TYZOR TnBT [2] (Tetra n butyl titanate) | 0.4 |

Foot note
[1] Commercially available from Bayer Material Science AG
[2] Commercially available from Dorf Ketal Process Method a) A reaction vessel was prepared with a packed column and interchangeable non packed column leading to a dean stark apparatus and condenser. Nitrogen sparging was applied to the vessel and continued throughout the process.

b) Items 1, 2 and 3 were added to the vessel and the non packed column engaged. The mixture was heated with stirring to 80 deg C. and held at temperature for 30 minutes to allow foam to subside. The reaction was then heated to 150 deg C. over a period of 1 hour and then held at 150 deg C. for a further 2.5 hours.

c) Items 4 to 6 were then added to the vessel and the packed column link to the dean stark apparatus was installed. The reactor was then heated to distillation with a maximum head temperature of 100 deg C. maintained during the process. The reaction temperature reached 200 deg C. after 30 minutes and 220 deg C. after 150 minutes.

d) The reactor temperature was maintained at 220 deg C. after 4 hours at temperature samples for acid value and viscosity test were taken at regular intervals. The maximum acid value target for the process was 7 mg KOH/gm, Viscosity was monitored using a cone and plate viscometer at 180 deg C.

e) Processing at 220 deg C. continued for a further 1.5 hours with regular samples.

f) When the target acid value was reached, (in this process Acid value 6.2 mgKOH/gm and viscosity 49.8 poise @ 180 deg C.) the reactor was cooled to 200 deg C. and item 7 was added.

g) After mixing for 20 minutes at 200 deg C. the contents of the reactor were discharged onto a cooling sheet and allowed to solidify. The solid material was crushed to a powder and characteristic details measured on a sample are shown in table 1.

Preparative Example 2 (PEI 2)

Formulation

| | Component | Amount (g) |
|---|---|---|
| 1. | DESMODUR W [1] (Bis(4-isocyanatocyclohexyl) methane) | 42.19 |
| 2. | Trimellitic anhydride | 64.8– |
| 3. | Ethylene glycol | 58.13 |
| 4. | Tris hydroxyethylisocyanurate (THEIC) | 58.11– |
| 5. | Trimethylol propane | 9.7 |
| 6. | Isophthalic acid | 24.12 |
| 7. | Terephthalic acid | 72.37 |
| 8. | TYZOR TnBT [2] (Tetra n butyl titanate) | 0.4 |

Foot note
[1] Commercially available from Bayer Material Science AG
[2] Commercially available from Dorf Ketal Process Method a) A reaction vessel was prepared with a packed column and interchangeable non packed column leading to a dean stark apparatus and condenser. Nitrogen sparging was applied to the vessel and continued throughout the process.

b) Items 1, 2 and 3 were added to the vessel and the non packed column engaged. The mixture was heated with stirring to 80 deg C. and held at temperature for 30 minutes to allow foam to subside. The reaction was then heated to 150 deg C. and then held at 150 deg C. for 5 hours.

c) Items 4 to 7 were then added to the vessel and the packed column link to the dean stark apparatus was installed. The reactor was then heated to distillation, with a maximum head temperature of 100 deg C. maintained during the process. The reaction temperature reached 190 deg C. after 30 minutes and 220 deg C. after 150 minutes.

d) The reactor temperature was maintained at 220 deg c after 3 hours at temperature samples for acid value and viscosity test were taken at regular intervals. The maximum acid value target for the process was 7 mg KOH/gm, viscosity was monitored using a cone and plate viscometer at 180 deg C.

e) Processing at 220 deg C. continued for a further 3 hours. When the acid value of the reaction mixture was within 3 mgKOH/gm of the target the temperature of the reaction mixture was increased to 230 deg C.

f) When the target acid value was reached, (in this process Acid value 5.4 mgKOH/gm and viscosity 12 poise @ 180 deg C.) the reactor was cooled to 180 deg C. and item 8 was added.

g) After mixing for 20 minutes at 180 deg C. the contents of the reactor were discharged onto a cooling sheet and allowed to solidify. The solid material was crushed to a powder and characteristic details measure on a sample are shown in table 1

Preparative Example 3 (PEI 3)

Formulation

| | Component | Weight gm |
|---|---|---|
| 1. | DESMODUR W [1] ( ) | 83 |
| 2. | Trimellitic anhydride | 125 |
| 3. | 1,6 hexane diol | 63 |

-continued

| | Component | Weight gm |
|---|---|---|
| 4. | Neopentyl glycol | 22 |
| 5. | Diethylene glycol | 22 |
| 6. | Tris hydroxyethylisocyanurate (THEIC) | 16 |
| 7. | Isophthalic acid | 25 |
| 8. | TYZOR TnBT [2] (Tetra n butyl titanate) | 3.6 |

Foot note
[1] Commercially available from Bayer Material Science AG
[2] Commercially available from Dorf Ketal Process Method
a) A reaction vessel was prepared with a packed column and interchangeable non packed column leading to a dean stark apparatus and condenser. Nitrogen sparging was applied to the vessel and continued throughout the process.
b) Items 1 and 2 were added to the vessel and the non packed column engaged. The mixture was heated with stirring to 100 deg C. and held at temperature for 30 minutes.
c) Items 3 to 7 were then added to the vessel and the packed column link to the dean stark apparatus was installed. The reactor was then heated to distillation, with a maximum head temperature of 100 deg C. maintained during the process. The reaction temperature reached 200 deg C. after 90 minutes and 220 deg C. after 150 minutes.
d) The reactor temperature was maintained at 220 deg c and samples for acid value and viscosity test were taken at regular intervals. The maximum acid value target for the process was 9 mg KOH/gm, viscosity was monitored using a cone and plate viscometer at 180 deg C.
e) When the acid value of the reaction mixture was within 3 mgKOH/gm of the target the temperature of the reaction mixture was reduced to 200 deg C.
f) When the target acid value was reached, (in this process Acid value 8.2 mgKOH/gm and viscosity 58.7 poise @ 180 deg C.) the reactor was cooled to 180 deg C. and item 8 was added.
g) After mixing for 20 minutes at 180 deg C. the contents of the reactor were discharged onto a cooling sheet and allowed to solidify. The solid material was crushed to a powder and characteristic details measure on a sample are shown in table 1

The preparative examples displayed physical characteristics as shown in Table 1, below.

TABLE 1

| | PEI 1 | PEI 2 | PEI 3 |
|---|---|---|---|
| Form | solids | solids | solids |
| melting point [° C.] [1] | 104 | 93 | 102 |
| Melt viscosity of the solid resin [Poise] {CAP 2000 + @ 180° C. [2]} | 43.5 | 13.2 | 71.4 |
| acid value [mg KOH/g] [3] | 6.2 | 5.3 | 8.1 |
| % imide [by weight of components] | 6.7 | 7.2 | 12.8 |
| % imide equivalent | 18.37 | 18.37 | 40.61 |
| Mn daltons [4] | 1757 | 1103 | 3010 |
| Mw daltons [4] | 3405 | 1855 | 47800 |

Footnotes
[1] Melting point determined by ball and ring method.
[2] Viscosity determined using a CAP 2000+ viscometer from Brookfield Instruments. Determined at 180 deg C. using spindle 06 at a spindle rotation speed of 400 rpm
[3] Acid value determined by titration with methanolic potassium hydroxide solution. Sample dissolved in Di-methyl formamide with phenolphthalein used as indicator.
[4] Determined using Waters Gel Permeation Chromatography device using a mixed media column with THF eluent at a flow rate of 0.9 ml/min. Molecular weight numbers obtained by reference to polystyrene standards.

Polyester Imide Solutions
Polyester imide solutions were prepared using the polyester imide polymers prepared in the preparative examples listed above, along with a solvent as shown in Table 2, below.

TABLE 2

| Samples | PEI 1 soln. | PEI 2 soln. | PEI 3 soln. |
|---|---|---|---|
| PEI 1 | 75.0 | | |
| PEI 2 | | 75.0 | |
| PEI 3 | | | 75.0 |
| Solvent[1] | 75.0 | 75.0 | 75.0 |

[1] The solvent used in Table 2 is a mixture of solvents, as shown in Table 3, below.

TABLE 3

| solvent used in Table 2 | |
|---|---|
| Solvent contents | Amount (g) |
| benzyl alcohol | 680 |
| ethyl lactate | 648 |
| propylene carbonate | 112 |
| xylene | 560 |

Coatings
Coatings were prepared from the PEI solutions described in Table 3, as detailed in Table below.

TABLE 4

| | Coating 1 | Coating 2 | Coating 3 |
|---|---|---|---|
| PEI 1 soln. | 100.0 | | |
| PEI 2 soln. | | 100.0 | |
| PEI 3 soln. | | | 100.0 |
| Benzylalcohol | 3.65 | 3.65 | 3.65 |
| Ethyl lactate | 6.22 | 6.22 | 6.22 |
| Propylene Carbonate | 12.2 | 12.2 | 12.2 |
| Byk-313 | 0.9 | 0.9 | 0.9 |
| Xylene | 3.62 | 3.62 | 3.62 |
| TEGO WET KL-245 (Evonik) | 0.16 | 0.16 | 0.16 |
| KOMELOL 90 GE (Melamin) | 0.73 | 0.73 | 0.73 |
| PHENODUR VPR 1785 (Cytec) | 3.8 | 3.8 | 3.8 |
| CYMEL 1123 | 1.61 | 1.61 | 1.61 |
| BYK-4510 ac PE (Byk-Altana | 4.38 | 4.38 | 4.38 |
| Tyzor TnBT catalyst (Dorf Ketal) | 4.38 | 4.38 | 4.38 |
| Xylene | 4.38 | 4.38 | 4.38 |
| Xylene | 4.41925 | | 9.9 |
| Benzylalcohol | 4.1782 | | 9.36 |
| Ethyl lactate | 4.4996 | | 10.08 |
| Propylene Carbonate | 2.97295 | | 6.66 |

The coatings were tested in the following manner with the results as shown in Table 5.
Tests
The viscosity of the coating is measured with a DIN 4 Cup at 23° C.
Coating Application of Uncoated Cans
Coatings were coated on aluminium monobloc can. About 3 grams of the inventive coating formulations 1-3 were filled individually into an aluminium can and then drained 10 minutes where the can was standing up side down with a angle of 45° thereby coating the internal of the can. Subsequently the can was placed into a convection oven to be cured at 240° C. for 5 minutes.

The coated cans were tested for coating thickness, for enamel ratings after the impact test also called falling weight test, solvent resistance, cross cut adhesion and blush and cutting edge adhesion after exposure to boiling water and after sterilisation in water according to the procedures described below.

Test Methods

Test methods include the following:

Coating Thickness

Coating thickness was measured according to a non-destructive measurement of anodic coatings applied onto an aluminium base, using a ISOSCOPE MP30, coating thickness measuring instrument. The uncoated aluminium can was used for calibration after it has been flatted. The thickness of the coating of the coated can was measured on the side wall of the can and on the bottom part. The measured thickness was either the average of 10 measurements or the lowest and highest values and it was reported in microns.

Impact Test

The impact test was carried out according to ASTM D2794.

The bottom part of the coated can was cut at a height of 20 mm and then with the coated side facing down on a Teflon coated fixture. A 1 kg weight is dropped from a 1 meter height to strike an indentation. The test was repeated two times on two individual cans under these conditions. The integrity of the coating was measured using a WACO Enamel Rater Instrument and a 1% salt solution containing 0.1% Diocylnatriumsulfosuccinat and reported in Milliamperes mA.

Solvent Resistance—NMP Test

Flatted parts of coated can were immersed in N-Methyl Pyrrolidone NMP in a glass container closed with a lid at room temperature for 24 hours. The coated parts were removed, washed up into a glass filled with MEK (Methyl Ethyl Ketone) and then dried. A hard rod coated with PTFE was brought into contact with the coating and moved forth-and-back with pressure 10 times over the coated surface. The coatings were checked on their ability to resist the chemical attack by NMP using a visual scale of 1-5 with 5 being the best.

Boiling Water Test

The coated parts of the can were immersed in boiling water at 100° C. for 15 minutes. The parts were removed and dried. The blush appearance was first rated. Blush is a mat whitish appearance of the coating. If the coating does not show any blush, then the rating is no blush; otherwise, it will be rated as very slight blush, slight blush, blush or strong blush. The same coated parts that were immersed in water were also tested in cross-cut adhesion and in cutting edge adhesion.

Cross-Cut Adhesion after Water Exposure

Cross-cut adhesion is measured according to DIN ISO 2409 standard. A crosshatch grid is made in the film using a grid comb and then covered by a tape (grade TESA 4104 clear). Within 60 seconds of application, remove the tape rapidly. The grid area is then checked for removal of coating from the substrate. The adhesion is then scored in accordance with the following scale.

TABLE 5

| | |
|---|---|
| GT0 | the edges of the cuts are completely smooth; none of the squares of the grid is detached. |
| GT1 | small flakes of the coating are detached at intersections; less than 5% of the area is affected. |
| GT2 | some flakes of the coating are detached along the edges and/or at intersections of the incisions. The area affected is 5-15% of the grid |
| GT3 | The coating has peeled along the edges and on parts of the squares of the grid. The area affected is 15-35% of the grid. |
| GT4 | The coating has peeled along the edges of the incisions in large strips and some squares are totally detached. The area affected is 35-65% of the grid. |
| GT5 | All degrees of peeling and flecking that can be not classified under GT4. |

Cutting Edge Adhesion after Water Exposure

After having being immersed in boiling water and dried, the coated parts of the can are cut in the length of the can from the lowest film thickness to the highest film thickness using a scissor. The cutting edge adhesion of the coating was evaluated according to the level of peeling from the substrate and using a rating 1-5 with 5 being the best.

Sterilization in Water

The coated parts of the can were immersed in water in a pressurizable metal container and placed into a autoclave where it was retorted at 129° C. for 60 minutes. After this, the parts were removed and dried. Immediately upon removal from the retort solution, the coatings were evaluated on their ability to resist blushing. Blush is a mat whitish appearance of the coating. If the coating does not show any blush, then the rating is no blush; otherwise, it will be rated as very slight blush, slight blush, blush or strong blush. The same coated parts that were immersed in water were also tested in cross-cut adhesion and in cutting edge adhesion.

The results of these tests, alongside a comparative example, PPG PAM Coating, are shown in Table 6, below.

The PPG PAM coating is a polyamide imide based coating and is commercially available as PPG 8460.

TABLE 6

| Samples | Coating 1 | Coating 2 | Coating 3 | Comparative example |
|---|---|---|---|---|
| Visco in 24 h/DIN 4 mm (23° C.), sec. | 53 | 44 | 50 | 80 |
| appearance wet sample | cloudy | cloudy | clear | cloudy |
| Testing on aerosol cans | | | | |
| Dry film thickness can A/Dom (μm) | 11.0 | 10.5 | 9.5 | 7.5 |
| Enamel rating after impact test on bottom part of the can-A, (mA) | 9.6 | 3.1 | 4.3 | 3.4 |
| Enamel rating after impact test on bottom part of the can-B, (mA) | 13.5 | 2.4 | 3.3 | 1.9 |
| dry film thickness can B/Dom (μm) | 9.0 | 9.0 | 9.5 | 5.5 |
| Solvent resistance-NMP test | | | | |
| dry film thickness can A, min/max (Fischer) (μm) | 10-15 | 8-14 | 8-18 | 6-8 |
| dry film thickness can B, min/max (Fischer) (μm) | 8-14 | 8-15 | 9-12 | 5-6 |
| NMP resistance-24 h-can A, thin/thick film weight | 3 | 5 | 5 | 5 |
| NMP resistance-24 h-can B, thin/thick film weight | 3 | 5 | 5 | 5 |

TABLE 6-continued

| Samples | Coating 1 | Coating 2 | Coating 3 | Comparative example |
|---|---|---|---|---|
| Water boiling test- | | | | |
| Adhesion Body-wall can A, X-hatch test/thin-thick | GT0 | GT0 | GT0 | GT0 |
| adhesion-cutting edge/min fw-A | 3 | 3 | 5 | 5 |
| adhesion-cutting edge/max fw-A | 2 | 4 | 5 | 5 |
| Blush-A/high film thickness | No blush | No blush | Slight blush | No blush |
| Adhesion Body-wall can B, Cutcross adhesion test | GT0 | GT0 | GT0 | GT0 |
| adhesion-cutting edge/min fw-B | 3 | 2 | 5 | 5 |
| adhesion-cutting edge/max fw-B | 3 | 2 | 5 | 5 |
| Blush-B/high film thickness | No blush | No blush | slight | No blush |
| Sterilization in water | | | | |
| Blush can A | No blush | No blush | Slight | No blush |
| Blush can B | No blush | No blush | Slight blush | No blush |
| Cut-cross adhesion can A | GT4 | GT4 | GT0 | GT0 |
| Cut-cross adhesion can B | GT5 | GT5 | GT0 | GT0 |
| Cutting edge adhesion A | 1 | 1 | 5 | 5 |
| Cutting edge adhesion B | 2 | 1 | 5 | 5 |

It has also been found by the present inventors that the addition of a silane containing component surprisingly increases the chemical resistance of the coating composition.

Preparative Example 4 (PEI 4)

Formulation

| Component | Amount (g) |
|---|---|
| 1. Desmodur 44 MC[1] (Methylene diphenyl 4,4'diisocyante) | 1090 |
| 2. Trimellitic anhydride | 1670 |
| 3. Ethylene glycol | 1490 |
| 4. Tris hydroxyethylisocyanurate (THEIC) | 1990 |
| 5. Isophthalic acid | 810 |
| 6. Terephthalic acid | 1860 |
| 7. Tyzor TnBT [2] (Tetra n butyl titanate) | 90 |
| 8. benzyl alcohol | 2780 |
| 9. ethyl lactate | 2650 |
| 10. propylene carbonate | 460 |
| 11. xylene | 2250 |

Foot note
[1] Commercially available from Bayer Material Science AG
[2] Commercially available from Dorf Ketal Process Method a) A reaction vessel was prepared with a packed column and interchangeable non packed column leading to a dean stark apparatus and condenser. Nitrogen sparging was applied to the vessel and continued throughout the process.
b) Items 1, 2 and 3 were added to the vessel and the non packed column engaged. The mixture was heated with stirring to 110 deg C. and held at temperature for 30 minutes to allow foam to subside. The reaction was then heated to 150 deg C. over a period of 1 hour and then held at 150-155 deg C. for a further 2.5 hours.
c) Items 4 to 6 were then added to the vessel and the packed column link to the dean stark apparatus was installed. The reactor was then heated to distillation, with a maximum head temperature of 100 deg C. maintained during the process. The reaction temperature reached 200 deg C. after 90 minutes and 230 deg C. after 180 minutes. Distillate was removed from the condensor into the collector of the dean stark apparatus.
d) The reactor temperature was maintained at 230 deg C. and samples for acid value and viscosity test were taken at regular intervals. The maximum acid value target for the process was 8 mg KOH/gm viscosity was monitored using a cone and plate viscometer at 180 deg C.
e) Processing at 230 deg C. continued for a further 4 hours with regular samples.
f) When the target acid value was reached (in this process Acid value 6.8 mgKOH/gm and viscosity 216 poise @180 deg C.) the reactor was cooled to 200 deg C. and item 7 was added.
g) After mixing for 20 minutes at 200 deg C. item 11 was added to the reactor and then after further mixing for 30 minutes the contents of the reactor were discharged to a mixing tank containing items 8, 9 and 10. A solution of the material was completed and the characteristics of the polymer solution were a solids content of 50.9% (measured at 150 C for 1 hour on 1 gm samples) and viscosity of 13.9 Poise at 25 deg C. From Gel permeation Chromatography, using polystyrene standards, the Molecular weight of the material was determined as Mn 1940 and Mw 6339.

Using PEI 4, a coating composition, Coating 4, was prepared using the following components in parts by weight.

| | |
|---|---|
| Benzyl alcohol | 74.00 |
| Propylene carbonate | 83.00 |
| Ethyl lactate | 41.00 |
| Xylene | 30.00 |
| solution PEI4 | 685.00 |
| Aralink 40-852 (Bitrez) | 22.00 |
| Xylene | 30.00 |
| BYK-313 | 3.00 |
| Borchi gol 1376 (OMG Borchers) | 2.00 |
| Tyzor tnbt titanate | 30.00 |

The solution of PE14 in this table is a 50.9% solution of the PE14 resin discussed above, prepared as follows.

Coating 4 was then used as a base coating for several further coatings, as shown in the following table. In these coatings, Coating 4, is as described above, whereas Coatings 5 to 10 represent Coating 4, with an additive as detailed in the following table.

| | Coating 4 (parts by wt) | Additive | Additive amount (parts by wt) |
|---|---|---|---|
| Coating 4 | | None | None |
| Coating 5 | 50 | 1 | 1.2 |
| Coating 6 | 50 | 2 | 1.5 |
| Coating 7 | 50 | 3 | 1.2 |
| Coating 8 | 50 | 4 | 1.2 |
| Coating 9 | 50 | 5 | 1.2 |
| Coating 10 | 50 | 6 | 1.2 |

Additives:
1 Geniosil GF 93 (3-Aminopropyltriethoxysilane)
2 Geniosil GF 82 (3-Glycidoxypropyltriethoxysilane)
3 Silquest A-137 (Octyl triethoxysilane)
4 Silquest A-1120 ((N-(Beta-Aminoethyl)-Gamma-Aminopropyl trimethoxysilane)
5 Silquest A-174NT (gamma-Methacryloxypropyl trimethoxysilane)
6 Silquest A-187 (gamma-Glycidoxypropyl trimethoxysilane)

The coatings were then tested for chemical resistance by coating the internal of an aerosol can, then filling the can with a solution as described below and keeping for 2 weeks at 55 C. The cans were then emptied and the crazing/hazing of the coating surface visually inspected and given a rating of 0 to 5, which 5 being perfect (no crazing/hazing observed) and 0 being very bad/very severe crazing/hazing.

The results are shown in the following table.

|  | Frosting/Crazing with filling 1 | Frosting/Crazing with filling 2 |
|---|---|---|
| Coating 4 | 2.5 | 2.5 |
| Coating 5 | 5 | 3.5 |
| Coating 6 | 4.5 | 3 |
| Coating 7 | 3.5 | 3.5 |
| Coating 8 | 3 | 3 |
| Coating 9 | 4 | 3 |
| Coating 10 | 3.5 | 3.5 |

Filling 1 = Hairspray, pH 6 to 6.5
Filling 2 = self tanning spray, pH 4.5

As can, be seen above, the use of silane in the coatings improves the chemical resistance of the coating, by reducing the frosting/crazing of the coated surface after exposure to chemicals at elevated temperatures.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A coating composition comprising a resin material comprising a polyester imide polymer; one or more titanate material; one or more OH reactive cross linking material and one or more silane material.

2. A coating composition according to claim 1, wherein the silane material comprises a silane material according to Formula I, or a polysiloxane polymer derived from one or more silane material according to Formula I:

$$(R^1)_n Si(OR^2)_m \qquad I$$

wherein each $R^1$ is independently selected from an optionally substituted linear or branched alkyl group, which may comprise one or more functional groups;
each $R^2$ independently represents H or an alkyl group optionally substituted linear or branched alkyl groups;

n=1 to 3;
m=1 to 3; and
n+m=4.

3. A coating composition according to claim 2, wherein the one or more functional groups each independently comprises hydroxyl, epoxy, amino (primary, secondary or tertiary), amido, cyano, isocyano, ethylenic unsaturation, carboxylic acid, aldehyde, ketone, C=O, esters, C1 to C4 alkyl esters of carboxylic acids, alkyl carboxyl oxy, linear or branched, saturated or unsaturated C1 to C6 alkyl carboxyl oxy, acryloxy and/or methacryloxy groups.

4. A coating composition according to claim 2, wherein the silane material comprises one or more of the following: γ-glycidyloxypropyl trialkoxy silane, γ-Glycidoxypropyl trialkoxysilane, alkyl trialkoxy silane, (N-(β-aminoethyl)-γ-aminopropyl trialkoxysilane, (N-(β-aminoethyl)-γ-aminopropyl triethoxysilane and/or γ-methacryloxypropyl trialkoxysilane.

5. A coating composition according to claim 1, wherein the polyester imide polymer is formed from one or more imide containing moiety substituted with i) two or more acid groups, ii) two or more alcohol groups or, iii) at least one acid group and at least one alcohol group.

6. A coating composition according to claim 5, wherein the imide containing moiety contains a cyclic imide group.

7. A coating composition according to claim 5, wherein the formation of the polyester imide polymer takes place in the presence of a catalyst.

8. A coating composition according to claim 7, wherein the catalyst is selected from tetra n butyl titanate; tetra iso propyl titanate; tetra ethyl hexyl titanate; zinc acetate; di butyl tin oxide; and/or butyl stannoic acid.

9. A coating composition according to claim 7, wherein the polyester imide polymer is a hydroxyl functional polymer.

10. A coating composition according to claim 8, wherein the titanate material comprises an organic titanate material.

11. A coating composition according to claim 8, wherein the titanate material is selected from tetra n-butyl titanate, $Ti(O-nC_4H_8)_4$; tetra iso propyl titanate, $Ti(O-CH(CH_2)_2)_4$; and/or tetra ethyl hexyl titanate, $Ti(O-CH_2-CH(C_2H_5)-CH_2-CH_2-CH_2-CH_3)_4$.

12. A coating composition according to claim 1, wherein the OH reactive cross linking material comprises phenolic material, isocyanate material, amino resin or hydroxyl functional silicone resin material.

13. A coating composition according to claim 1, which is substantially free of bisphenol A and derivatives or residues thereof, and bisphenol F and derivatives or residues thereof.

14. A coating composition according to claim 1, which is substantially free of N-methyl pyrolidine.

15. A coating composition according to claim 1, wherein the coating composition is a powder coating composition.

16. A coating composition according to claim 1, wherein the coating composition further comprises one or more solvent.

17. A coating composition according to claim 1 wherein the composition further comprises an acidic polyester material.

18. A coating composition according to claim 17, wherein the acidic polyester material comprises the reaction product of one or more polyester with a phosphorous acid.

19. A metal substrate coated at least in part with a coating composition according to claim 1.

20. An aluminium tube coated on at least a portion thereof with a coating composition according to claim 1.

21. A monoblock aerosol can coated on at least a portion thereof, such as an inside portion thereof, with a coating composition according to claim 1.

22. A method of coating a substrate, the method comprising applying a coating composition according to claim 1 to the substrate and curing the same.

* * * * *